United States Patent [19]

Kurtz

[11] 4,340,348
[45] Jul. 20, 1982

[54] GLOVE MOLDING APPARATUS

[75] Inventor: Leonard D. Kurtz, Woodmere, N.Y.

[73] Assignee: BioResearch Inc., Farmingdale, N.Y.

[21] Appl. No.: 248,540

[22] Filed: Mar. 27, 1981

Related U.S. Application Data

[62] Division of Ser. No. 125,925, Feb. 29, 1980.

[51] Int. Cl.³ .......................................... B29H 3/042
[52] U.S. Cl. .................... 425/270; 264/255; 264/303; 264/305; 264/306; 264/307; 425/275
[58] Field of Search ............... 264/255, 303, 305, 307, 264/306; 425/270, 275

[56] References Cited

U.S. PATENT DOCUMENTS

| | | | |
|---|---|---|---|
| 2,581,248 | 1/1952 | Ganz | 425/275 |
| 3,013,302 | 12/1961 | Croxton | 264/303 |
| 3,170,194 | 2/1965 | Abildgard | 425/275 |
| 3,286,011 | 11/1966 | Kavolir et al. | 264/307 |
| 3,411,982 | 11/1968 | Kavolir et al. | 264/307 |
| 3,487,146 | 12/1969 | Tillotson | 264/303 |
| 3,856,561 | 12/1974 | Esemplare et al. | 264/306 |
| 3,919,442 | 11/1975 | Esemplare et al. | 264/306 |
| 3,967,014 | 6/1976 | Esemplare et al. | 264/306 |
| 4,027,060 | 5/1977 | Esemplare et al. | 428/212 |
| 4,135,867 | 1/1979 | Stockum | 425/275 |

Primary Examiner—James H. Derrington
Attorney, Agent, or Firm—Larson and Taylor

[57] ABSTRACT

A method and apparatus provided for manufacturing elastomer gloves having percentage elongation of at least 300%. In order to prevent excess deposits of the polymer latex in the areas of the tips of the fingers and the webs between the fingers when the hand-shaped molds are coated, by dipping, with the polymer, the surfaces of the mold in these areas are formed as non-rounded, non-horizontal inclined surfaces which join at an apex and define an included angle therebetween. This arrangement prevents the pooling of the polymer latex in the areas in question, this pooling being the cause of the excess deposits and being characteristic of prior molds of this general type. In order to provide sufficient coagulant around the sharp corners formed in the areas of the tips of the fingers and the webs between the fingers so as to provide sufficient coating in those areas, it is necessary to use a heated mold and to provide sufficient dwell time and withdrawal time for the mold from the coating baths during the process.

3 Claims, 4 Drawing Figures

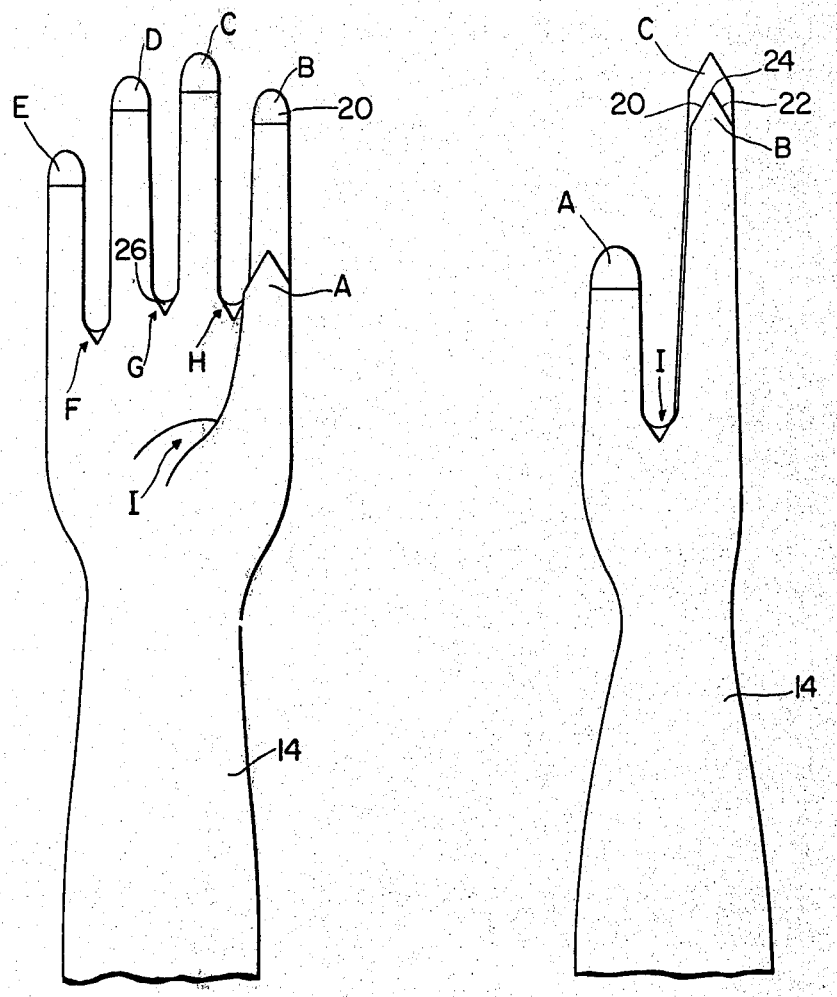
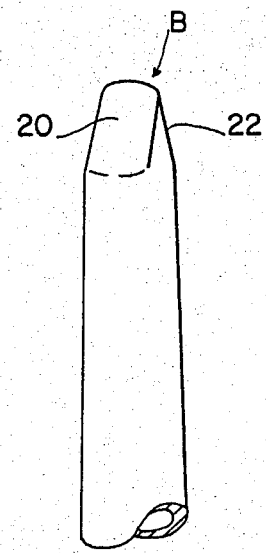
FIG. 2  FIG. 3
FIG. 4

GLOVE MOLDING APPARATUS

This is a division of application Ser. No. 125,925 filed Feb. 29, 1980 pending 140.

FIELD OF THE INVENTION

The present invention relates to a method and apparatus for molding elastomer gloves.

BACKGROUND OF THE INVENTION

In prior U.S. Pat. Nos. 3,856,561; 3,967,014; 3,919,442 and 4,027,060, there is described a method of manufacturing gloves, such as surgical gloves wherein a synthetic resin slip coating is provided as inner and outer layers on the rubber elastomer layer. This provides a surgical glove with a slip coating so that the surgeon no longer needs to use powder in order to put on and remove the gloves.

A substantial difficulty has arisen, however, in the use of the process described in the above referenced patents. It has been found that the polymer latex tends to form small pools of excess polymer latex on certain surfaces of the glove mold. These pools, upon drying, leave excess deposits of the polymer latex in these areas. More specifically, the areas of the molds where these problems occur are the tips of the fingers and the interfinger webs of the glove mold. These excess deposits formed by the use of the conventional surgical glove molds have a poor adhesion to the underlying rubber latex. These polymer deposits have a tendency to shed into the surgical wound because of the poor adhesion. Such shedding is obviously undesirable. It is not possible to remove the excess polymer latex from the glove without ruining the glove.

Attempts have been made to solve this problem by withdrawing the mold from the elastomer tank with the fingers being withdrawn last. However, in using this procedure, it has been found that webbing occurs between the fingers and that when the webs break an excess of the polymer latex occurs on the surface of the glove.

SUMMARY OF THE INVENTION

The present invention is in part based on the inventive appreciation that as the finger tips and webs of the coated mold emerge from the polymer solution in the manufacturing process described above, a small section of all of the finger tips and a section of all of the webs between the finger are horizontal as they emerge from the surface of the polymer bath. It has been determined that it is these sections which have the excess deposits referred to above. Moreover, the deposits in question are exclusively limited to these horizontal surfaces.

According to the invention, non-rounded, angled surfaces are provided in each of the areas which are prone to excess deposits of polymer, i.e., at the tips of the fingers and the connecting webs between the fingers. In a preferred embodiment, an included angle is introduced at the locations in question so that all horizontal surfaces are eliminated and the formation of pools of excess polymer is done away with. In a specific exemplary embodiment, the surfaces form an included angle of 90 degrees, i.e. each surface forms an angle of 45 degrees with the vertical. However, the included angle can, of course, be varied and an included angle of 120 degrees (a 60 degree slope with respect to the vertical) or even 150 degrees (a 75 degree slope with respect to the vertical) might be satisfactory. Of course, the closer the surfaces approach the horizontal the greater the probability of pooling occurring. On the other hand, as the included angle is increased, and thus the slope of the angled surfaces approaches 90 degrees, the probability of pooling decreases. However, the glove must be worn by the human hand and, moreover, there may be difficulties in the fabrication of the mold for such angles since thin molded walls are preferably used, and this would create problems in providing very steep surfaces, i.e., very small angles with respect to the vertical.

While it was found that by eliminating horizontal surfaces in the manner described, it was possible to avoid pooling problems in connection with laying down the polymer coating, the sharp corners on the mold tended to prevent the formation of a sufficient elastomer layer in that area. This problem was solved by modifying the method of manufacture of the glove by heating the mold to a temperature of about 140° F. and providing a dwell time and withdrawal time from the coagulant and elastomer baths which permits the formation of a uniform elastomer layer even in the finger tip and web areas where sharp corners exist.

Other features and advantages of the invention will be set forth in, or apparent from, the detailed description of the preferred embodiment described below.

BRIEF DESCRIPTION OF THE DRAWINGS

FIGS. 2 and 3 are front and side elevational views, respectively, of an individual glove mold incorporating the present invention; and FIG. 4 is a perspective view of a detail of one finger of the mold of FIGS. 2 and 3, broken away to show the construction thereof.

DESCRIPTION OF THE PREFERRED EMBODIMENT

Figure 1:
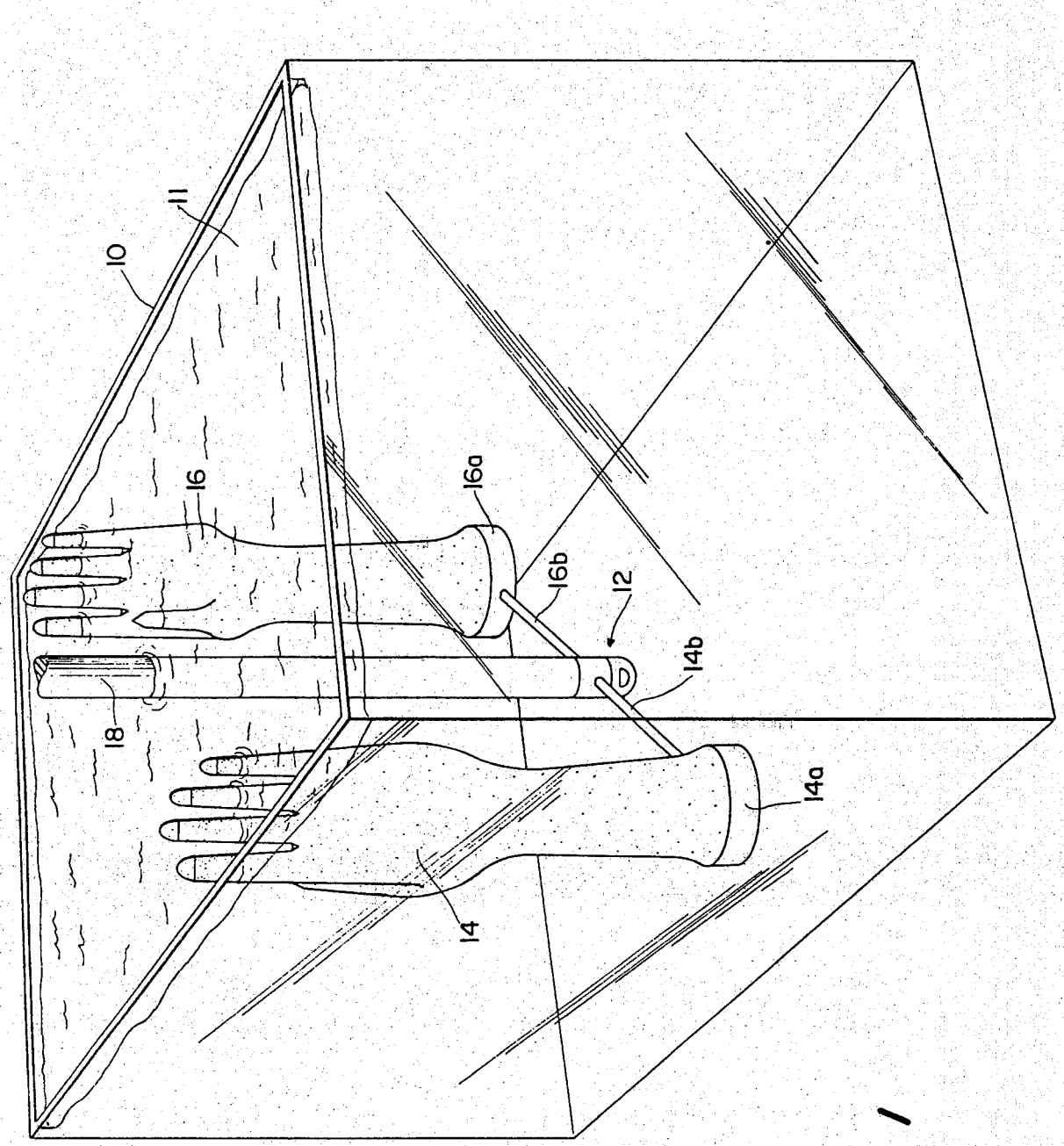
FIG. 1 is a perspective view of a molding apparatus for making surgical gloves, showing the glove molds for the individual gloves as they emerge from the polymer or rubber latex baths.

Referring to FIGS. 2 and 4, an exemplary glove mold constructed in accordance with the present invention is shown, the illustrated mold corresponding to mold 14 of FIG. 1. As discussed above, pooling of the coating polymer at certain locations on the mold results in excess deposits of this polymer at various locations on the glove produced. These locations, which are nine in number, are identified in FIG. 2 (and, in part, in FIG. 3) by the leters A to I, and, as shown, are the tips of the fingers (A to E) and the webs between fingers (F,G,H,I). According to the present invention, the surfaces of the mold of these locations are formed as nonrounded, angled (non-horizontal) surfaces and in the illustrated embodiment, as a pair of surfaces defining an included angle therebetween. Thus, considering finger tip B as typical, the surfaces 20 and 22 forming this tip (see FIG. 3) are inclined and join at an apex 24 to define an included angle therebetween. Similarly, the web G between the fingers having tips D and C is formed by a pair of inclined surfaces, one of which, denoted 26, is shown.

In the illustrated embodiment, the included angle appears to be about 60 degrees or 70 degrees (each surface forming an angle of 30 degrees to 35 degrees with the vertical) and actual testing has been performed with an included angle of 90 degrees. However, as discussed above, included angles up to 150 degrees or more could be acceptable. Further, as was also discussed, a small included angle could be used although while the formation of deposits would be further decreased, there are practical limits from both an appearance and a manufacturing standpoint. In this latter regard, as shown in FIG. 4, the mold is preferably constructed as a thin shell, preferably of porcelain or the like. Thus, a more or less arbitrary range of about 50 degrees or less to about 150 degrees is contemplated.

Referring to the FIG. 1, a molding apparatus is shown which includes a tank 10 having a bath or solution 11 of a suitable polymer therein. For purposes of illustration, a polymer latex of the type disclosed in the above referenced prior art patents will be considered although it is clear that other polymers can be used. A mold device 12 comprises a pair of glove molds 14 and 16 for molding a pair of gloves. Molds 14 and 16 are preferably fabricated of a thin walled porcelain and are mounted on respective ones of a pair of base mounts 14a and 16a which are connected by respective rods 14b and 16b to a central mounting or carrying shaft 18.

In use of the molding apparatus of FIG. 1, glove molds 14, 16 are completely submerged in the polymer latex bath 11 contained in tank 10, the mold device 12 which supports glove molds 14 and 16 being lowered into bath 11 by means of mounting shaft 18. The molds are heated internally to a temperature of about 140° F. The mold is allowed to remain in the tank for a dwell time of about five minutes. The polymer latex solution 11 thus surrounds molds 14, 16 so as to form a coating thereon and thereafter the entire mold device is slowly withdrawn from tank 10. Withdrawal time of the mold from the bath should be about ten to twelve minutes. In FIG. 1, the glove molds 14, 16 are shown in the positions they assume just after the tips of the molds emerge from bath 11. The shaft 18 is, of course, continuously raised so that eventually all of the molds 14, 16 are completely removed from the bath.

Following the deposition of the polymer latex as above described, the mold with polymer coating is then dipped in coagulant of the type described in the above referenced patents. The mold is dipped rapidly and is brought out after no dwell time over a period of about 30 seconds. Subsequently, a rubber latex coating is applied. The mold is cooled to 100° F. and is dipped in the rubber latex bath which is at a temperature of approximately 70° F. The mold is inserted in the bath at a rate of approximately 1.2 inches per second and is permitted to remain fully immersed for a period of 8 to 10 seconds. The mold is then withdrawn from the bath at the same rate as the insertion rate. The glove mold with the inner polymer coating and outer rubber latex coating is then given a final polymer latex coating. The mold is inserted in the polymer bath so as to be fully immersed within approximately three seconds and the mold temperature is then raised to about 140° F. The mold is permitted to remain fully immersed for a period of five minutes and then is slowly withdrawn over a period of ten to twelve minutes.

By the above described process, a surgical glove is produced having a rubber latex layer with inner and outer polymer coatings. By eliminating horizontal surfaces on the mold pooling of the polymer is avoided and by use of a heated mold and dwell and withdrawal periods as specified herein a sufficient coating of polymer and elastomer even on pointed surfaces of the mold is assured.

Although the invention has been described in relation to an exemplary embodiment thereof, it will be understood by those skilled in the art that variations and modifications can be effected in this exemplary embodiment without departing from the scope and spirit of the invention.

I claim:

1. A molding device for molding gloves having a percentage elongation of at least 300%, said device including a tank containing a polymer, a pair of glove molds supported on a suppot arrangement adapted to be submerged in said tank so as to provide a coating of said polymer on said molds, each of said glove molds comprising a handshaped mold member including separate, spaced fingers and the tips of the fingers and the spaces between the fingers comprising non-rounded, non-horizontal inclined surfaces which are joined at an apex and define an included angle therebetween.

2. An apparatus as claimed in claim 1 wherein said included angle is between about 50 and 150 degrees.

3. An apparatus as claimed in claim 2 wherein said included angle is between 60 degrees and 90 degrees.

* * * * *